United States Patent [19]

Ito

[11] Patent Number: 4,614,346
[45] Date of Patent: Sep. 30, 1986

[54] INFLATABLE UNITARY PACKER ELEMENT HAVING ELASTIC RECOVERY

[75] Inventor: Leonard N. Ito, Denver, Colo.

[73] Assignee: The Gates Rubber Company, Denver, Colo.

[21] Appl. No.: 357,498

[22] Filed: Mar. 12, 1982

[51] Int. Cl.[4] .............................................. F16J 15/48
[52] U.S. Cl. ........................................ 277/34; 277/30; 277/230; 166/187
[58] Field of Search ............... 166/187, 277, 120-122, 166/179, 315, 195, 212; 277/34, 34.3, 34.6, 121, 1, 9, 9.5, 30, 31, 32, 116.2, 116.6, 120, 229, 230; 285/294, 297

[56] References Cited

U.S. PATENT DOCUMENTS

| | | | |
|---|---|---|---|
| 1,828,381 | 10/1931 | Schuyler | 166/195 X |
| 2,643,722 | 6/1953 | Lynes | 166/187 |
| 2,778,432 | 1/1957 | Allen | 277/34 X |
| 3,003,798 | 10/1961 | Sandlin | 285/45 X |
| 3,837,947 | 9/1974 | Malone | 277/34 X |
| 4,153,656 | 5/1979 | Bunyan | 277/1 X |
| 4,191,383 | 3/1980 | Baker et al. | 277/1 |
| 4,244,590 | 1/1981 | Sanford | 277/34.3 |
| 4,260,164 | 4/1981 | Baker et al. | 277/34 |
| 4,310,161 | 1/1982 | Streich | 277/34 |
| 4,349,204 | 9/1982 | Malone | 166/187 X |
| 4,372,562 | 2/1983 | Carter | 277/34 |
| 4,424,861 | 1/1984 | Carter et al. | 166/212 X |
| 4,467,835 | 8/1984 | Champleboux | 277/34 X |

*Primary Examiner*—Robert S. Ward
*Attorney, Agent, or Firm*—C. H. Castleman, Jr.; H. W. Oberg, Jr.; Frank P. Grassler

[57] ABSTRACT

An inflatable packer comprising an elastomeric tubular core, an outer cover, an annular reinforcement sheath sandwiched between the core and cover comprising a strength zone composed of strain-resisting elements of high modulus extending helically at alternate lay angles of less than 40° with respect to the packer axis, and sleeve means to which the reinforcement is securely attached at each end of the packer. In one embodiment a transition reinforcement zone is interposed between the tubular core and strength zone to improve the flex properties and increase the life of the packer. In another embodiment an improved anchor means formed of a frusto-conical matrix encapsulates embedded reinforcement members.

35 Claims, 4 Drawing Figures

4,614,346

INFLATABLE UNITARY PACKER ELEMENT HAVING ELASTIC RECOVERY

BACKGROUND OF THE INVENTION

This invention relates to an inflatable packer for sealing an annular space in a wellbore about a supporting element to which the packer is attached.

An inflatable packer is a downhole tool which is inflatable with a fluid to seal off an annular space in the well, for example between the casing and the wellbore, or between a drill string or other retrievable tool and an outer well casing. Although not so limited, the packer of the invention is particularly suited for isolating zones within a well for such purposes as cementing, fracturing, treating, testing, preventing gas migration to the surface, and for gravel pack operations.

Inflatable packers normally include an elastomeric body within which is disposed or embedded a reinforcement sheath. A recognized problem with prior art packers has been the inability to securely anchor the reinforcing elements of the packer body to end sleeve members which couple the packer assembly to the casing, drill string or other downhole tool. Typically, the reinforcing elements have been clamped at their ends between tapered wedging surfaces. In some instances, the mechanical clamping has been augmented by use of epoxy adhesives along the interface between the reinforcement free ends and the wedging portions of the sleeve terminations. Other problems in practice include the tendency of the body of the packer to rupture or develop pinhole leaks, and the failure of the body to return substantially to its original uninflated configuration, after repeated inflation/deflation cycles. Examples of such prior art include U.S. Pat. Nos. 2,643,722 to Lynes et al., 2,872,230 to Desbrandes, 3,028,915 to Jennings, and 4,191,383 to Baker et al.

The subject invention has as its primary object the provision of a packer construction which not only overcomes such prior art problems but also withstands high internal inflation pressures and external differential pressures across the packer element, and also the provision of an improved means for anchoring the ends of the reinforcement to the end sleeves of the packer assembly.

SUMMARY OF THE INVENTION

In one aspect, the inflatable packer of the invention comprises an elastomeric tubular core; an outer cover; an annular reinforcement sheath sandwiched between the core and cover and comprising multiple reinforcement zones, namely: a strength zone composed of strain-resisting elements of relatively high modulus, said elements being helically disposed alternately in opposite lay sense within the sheath annulus at lead angle(s) of less than 40°; and a transition zone disposed radially inwardly of the strength zone composed of a plurality of layers of strain-resisting elements of relatively low modulus compared to those of the strength zone, portions of the low modulus elements being helically disposed respectively in opposite lay sense within the sheath annulus at lead angle(s) of less than 40°; and the packer also comprises sleeve means to which at least a portion of the reinforcement is attached at respective ends of the packer.

In another aspect, the inflatable packer of the invention comprises an elastomeric tubular core; an outer cover; an annular reinforcement sheath sandwiched between the core and cover and comprising at least a strength zone composed of strain-resisting elements of relatively high modulus, said elements being helically disposed alternately in opposite lay sense within the sheath annulus at lead angle(s) of less than 40°; and sleeve means to which the reinforcement is secured at respective ends of the packer, the high modulus elements being anchored by embeddment in an annularly tapered substantially rigid matrix attached to the sleeve means.

The invention also comprehends the inflatable packer described above, in assembly with a tubular supporting element such as a mandrel to which the packer is attached.

BRIEF DESCRIPTION OF THE DRAWINGS

The invention in its preferred embodiment will be more particularly described by reference to the accompanying drawings, in which like numerals designate like parts, and in which.

PREFERRED EMBODIMENTS OF THE INVENTION

Figure 1:
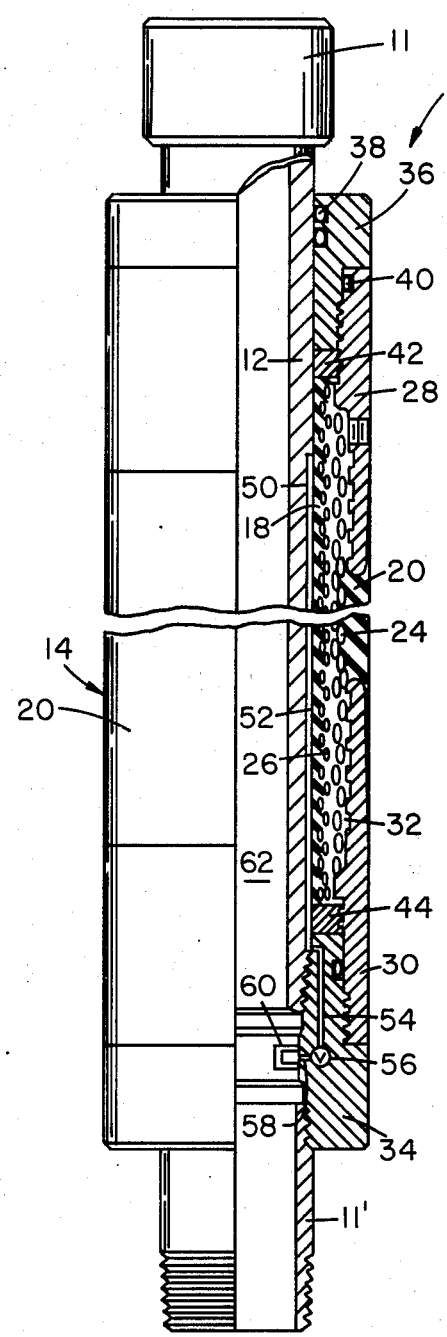
FIG. 1 is a vertical sectional view, partially cutaway, of an inflatable packer and associated tool assembly therefor, the packer being shown deflated.
Figure 2:
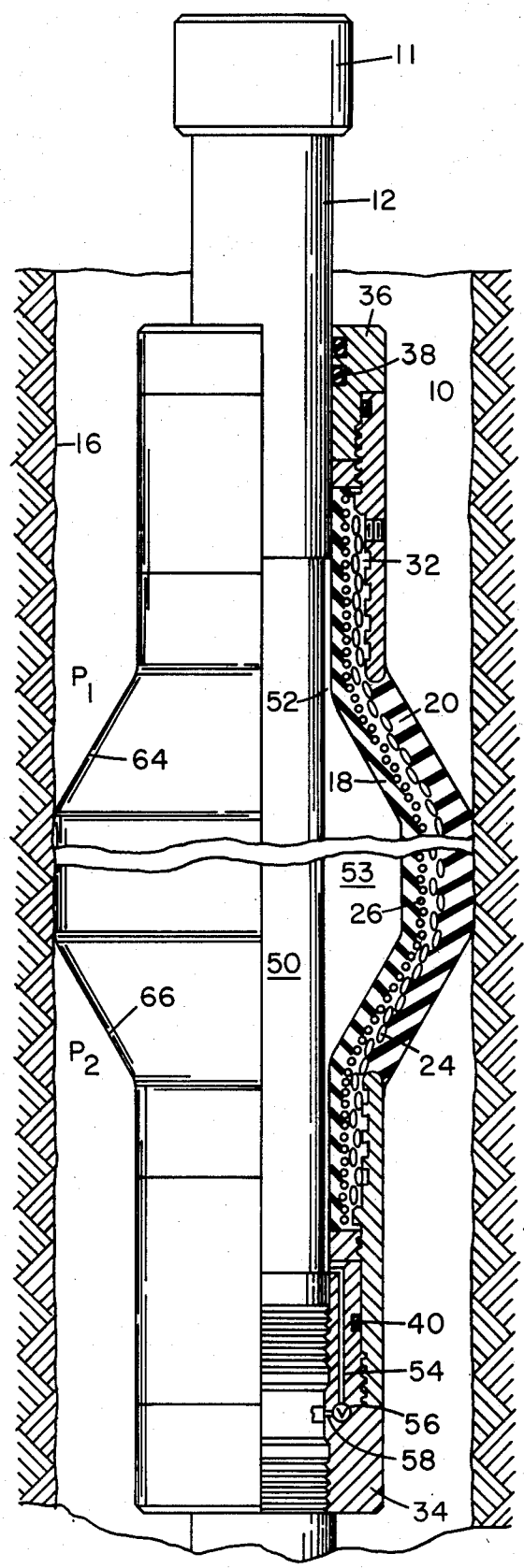
FIG. 2 is a vertical sectional view, partially broken away, of the packer and tool assembly of FIG. 1, shown inflated against a wellbore.

Referring to the drawings and particularly FIGS. 1 and 2, there is shown an inflatable packer assembly generally at 10 including an inner cylindrical mandrel 12 connected to a casing string 11, 11' and the inflatable annular packer element 14 (shown in detail in FIG. 3) supported on mandrel 12. Although this detailed description describes a casing type packer to seal between the well casing and wellbore 16 of a subterranean formation, the packer can alternatively be installed on a drill string (corresponding to mandrel 12) located inside of a well casing, for sealing the annular space therebetween.

The packer element 14 includes an elastomeric tubular core 18, an outer abrasion resistant elastomeric cover 20, and an annular reinforcement sheath 22 (FIG. 3) sandwiched between the core 18 and cover 20. In the preferred embodiment the reinforcement sheath is formed of multiple reinforcement zones including a strength zone 24 and a transition zone 26, which will be discussed in more detail hereinafter.

The packer element further includes respective end sleeves 28, 30 to which at least a portion of the reinforcement is attached by anchoring in matrix 32.

Lower end sleeve 30 is internally threaded for coupling engagement with externally threaded lower end shoe 34 which in turn is securely attached by way of threaded connection to mandrel 12 and casing segment 11'. The upper end of the packer assembly, on the other hand, is slidably connected with respect to mandrel 12 by way of sliding upper shoe means 36, which is threadedly connected to upper packer end sleeve 28. Shoe means 36 slidingly engages the radially outer cylindrical surface of mandrel 12 and is sealed in respect thereto to prevent leakage between the mandrel and shoe by O-ring seals 38. The end shoes 34, 36 are also sealed in respect to sleeves 28, 30 via O-ring or other seals 40.

Figure 3:
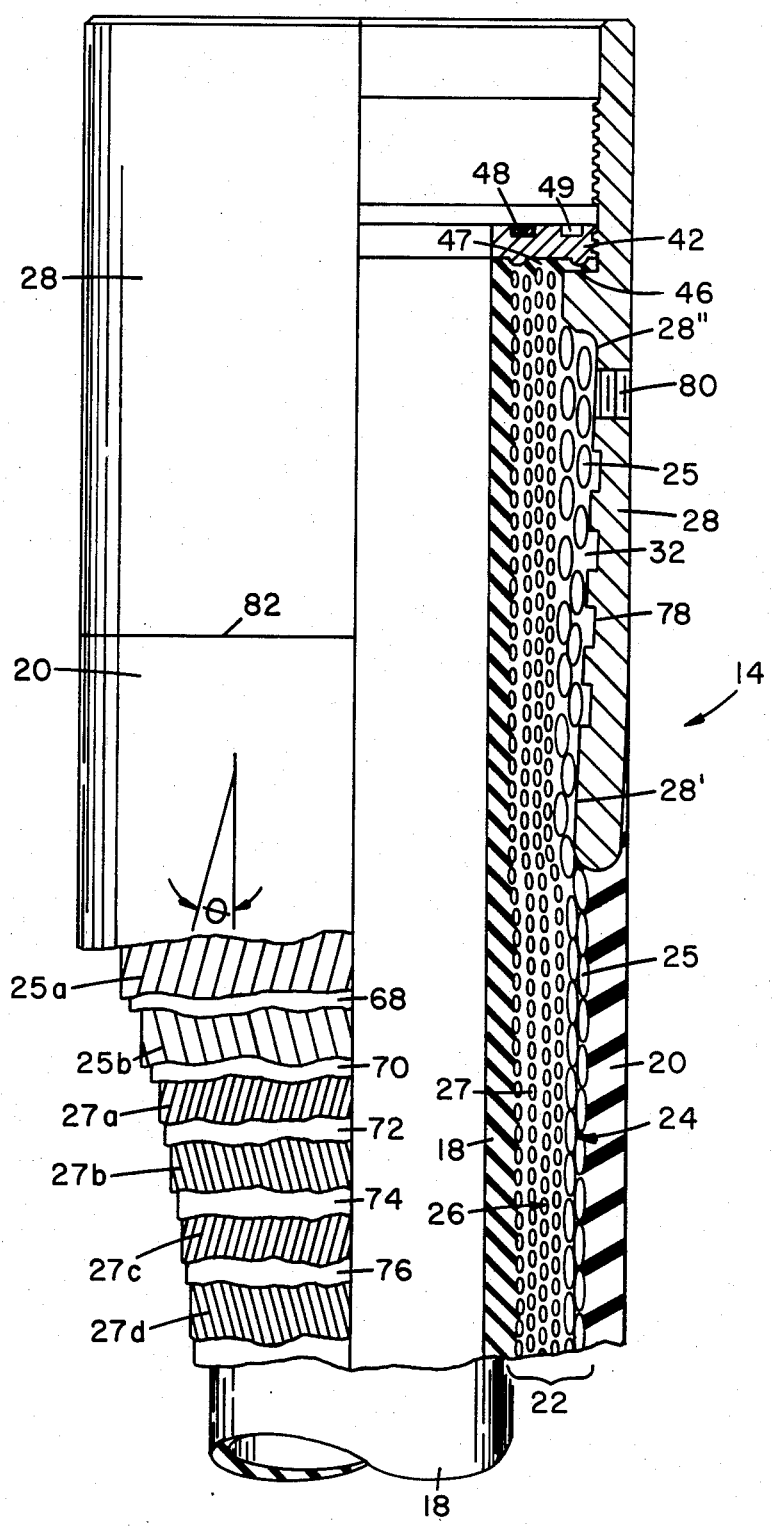
FIG. 3 depicts a vertical sectional, broken away view showing the detailed construction of the packer body and end termination arrangement.

The tubular core or bladder element 18 is also sealed by way of threaded collars 42, 44 which pinch off the radially extending end of tube 18 against a shoulder 46 of the end sleeve, as best seen in FIG. 3. The collars 42, 44 are also preferably provided with seals 48 (FIG. 3) for effecting a fluid-tight seal with the respective end shoes.

Mandrel 12 is reduced in outside diameter along its medial portion 50 to define in respect to the adjacent tube 18 a small annular clearance 52 which is in communication with passageway 54, valve means 56 (shown schematically), inlet port 58 and break-off plug 60. In a manner well known to those skilled in the art, inflating fluid such as well fluid may be selectively directed from the interior 62 of the casing string upon severance of break-off plug 60 as shown in FIG. 2, through port 58, valve 56, passageway 54 and then into the annular clearance 52 to inflate the packer body.

As internal inflating pressure is applied fluid flows into annulus 52 and expands the packer body radially outwardly against the formation 16 as shown in FIG. 2. The internal inflating pressure will be substantially maintained within the resultant chamber 53 by virtue of the sealing of mandrel 12 to the packer assembly, controlled selectively by valve 56, which may be a check valve. Similarly, by means not shown but well known to those skilled in the art, valve 56 may selectively be opened to partially or fully deflate the packer and return it to its deflated position as shown in FIG. 1.

As the packer assembly is inflated, the slidable end of the packer will move downwardly on the mandrel as shown in FIG. 2 as the packer element effectively foreshortens.

The use of a tough elastomeric cover material 20 of high elongation enables the packer to make a tight seal against the formation surface and, because of the unique reinforcement sheath and anchoring means the packer in its inflated position shown in FIG. 2 is able to withstand the internal inflating pressure and simultaneously the upper and lower external formation pressures $P_1$ and $P_2$. External pressures $P_1$ and $P_2$ may be substantially different whereby a large differential pressure is applied against the respective surfaces 64, 66. This may cause a distortion or bulging of those shoulders (not shown) in operation.

The detailed construction of the packer element which withstands the aforementioned internal and external pressures while maintaining the desired seal, and while permitting repeated deflations and inflations with substantially full elastic recovering to the initial configuration, will now be described, particularly in reference to FIG. 3.

The packer body is preferably a unitary vulcanized rubber or rubber-like body in which the reinforcement sheath 22 is embedded so that the individual reinforcement elements are substantially encapsulated in and bonded to, physically and/or chemically, the rubber-like matrix body. Accordingly, tube 18 is elastomeric, preferably formed of a natural or synthetic rubber compounded for chemical resistance to the well fluids and inflation fluids, and having the desired properties of sufficiently high elongation to inflate to the desired diameter, elastic recovery and ability to bond to the adjacent reinforcement layer. Examples of suitable materials for typical applications include rubber formulations based on neoprene or nitrile compounds, which formulations are well known. In certain applications plastic elastomers or blends of such with rubbers are useful.

Similarly, the cover 20 is preferably formed of a rubber or rubber-like elastomeric material such as natural or synthetic rubber also resistant to abrasion, and having the ability to form a tight seal against the formation or well casing to which it is pressed. Suitable materials include compounds of neoprene and nitrile, and in some cases plastic based elastomers or plastic/rubber blends may be used.

In accordance with one aspect of the invention, the reinforcement sheath 22 which is sandwiched between the core 18 and cover 20 is comprised of multiple reinforcement zones. The properties of the different reinforcement zones are selected to provide the minimum strength required to withstand the pressures involved (together with a safety factor) by provision of a gradation in strength radially through the zones. At least one transition or gradation layer is positioned between the tube and principal reinforcing members to provide a homogenizing backup layer of reinforcement which ensures that the tube 18 does not extrude through interstices which may exist between adjacent strength elements in strength zone 24. As is known, if the packer is inflated sufficiently, the principal reinforcing members may spread apart slightly, enhancing the potential for extrusion.

As depicted in FIG. 3, the reinforcement sheath 22 is composed of two distinct reinforcement zones, strength zone 24 and radially inwardly disposed transition reinforcement zone 26. The strength zone is composed of the principal strain-resisting elements of relatively high modulus, preferably wire, in the form of filaments or cables for instance, and preferably bearing a coating of brass or other material to enhance adhesion to the rubber-like matrix. The individual strain-resisting elements 25, preferably formed of brass coated steel cable, are helically disposed in two layers alternately in opposite lay sense, outer elements 25a being helically disposed in the right-hand sense, and underlying layer formed of strain-resisting elements 25b being helically disposed in the left-hand sense. The lead angle $\theta$ which the strength elements make with respect to the longitudinal axis of the packer is substantially less than the locking angle (i.e., about 54°). Preferably the lead angle is substantially less than 40°, more preferably less than about 30°, and most preferably less than about 18° (in deflated condition). Of course, the lead angle will be chosen to suit the particular application and particularly the amount of radial expansion which the packer must undergo to make sealing engagement with the formation, well casing or other outer surface. The greater the proportional radial excursion of the packer upon inflation, the lower the lead angle $\theta$ should be to ensure that in the inflated position the individual reinforcement elements make an angle with the longitudinal axis of the packer which is substantially less than the locking angle of about 54°. From a practical standpoint, however, the lead angle should not be reduced below about 10°.

The strain-resisting elements of the strength zone are preferably applied as spiral sheaths as shown in FIG. 3, but may also be in other configurations such as one or more braided sheaths which combine in a single layer elements of opposite lay sense. However, it has been found that braided reinforcement layers tend to lock up upon full expansion in certain situations and, therefore, not recover substantially to the original straight position upon deflation. This in turn causes abrasion and eventual failure of the braid reinforcement.

To ensure torsional balance the spiralled reinforcement layers should be present in pairs of alternate lay sense, the number of pairs employed depending upon the gauge and modulus of the reinforcing elements, and the particular application. Between each pair of layers there is provided a skim layer of elastomer 68, and an additional such layer 70 between the strength and transition reinforcement zones. These layers provide embedment for the strain-resisting elements and allow the proper pantographing action of the elements during inflation/deflation with minimal (if any) abrasion between layers, as the lead angle $\theta$ changes.

The transition reinforcement zone 26 is composed of a plurality of layers (four shown) of strain-resisting elements 27a, 27b, 27c, 27d which are helically disposed respectively in opposite lay sense within the reinforcement sheath annulus. The individual strain-resisting elements possess a relatively low modulus in comparison to the elements 25a, 25b of the strength zone but are disposed at lead angles which are substantially the same with the corresponding layer of the strength zone, e.g., elements 25a and 27a are disposed at substantially the same lead angle and in the same lay sense. And, unlike the teaching in the aforementioned U.S. Pat. No. 2,643,722 to Lynes et al. adjoining layers of the strength zone and transition zone (i.e., the strength layer formed of elements 25b and transitional layer formed of elements 27a) as well as the adjoining layers within a distinct reinforcement zone should be in alternating lay sense. In this manner, upon inflation of the packer element the individual strain-resisting elements from the same or adjoining layered zones will be maintained in their distinctive layer rather than nesting together.

Typically, the strain-resisting elements of the transitional zone may be formed of smaller gauge wire or more preferably from rubber carcass type reinforcement materials such as textile cords, preferably spiralled in a helix as shown or alternately applied as braided layers, or the like. An especially preferred reinforcement configuration is the so-called tire cord construction formed of wire or textile cord elements 27a, b, c, d, of polyester, aramid, fiber glass, nylon or the like, disposed at the lead angle as shown, and held together by spaced laterally disposed pic cords (of reduced denier) as is known. As in the case of the strength zone, it is highly preferred that the layers of reinforcement in the transition zone be separated by interposed elastomeric layers 72, 74, 76, etc., so that the strain-resisting elements in the respective layers are substantially fully encapsulated in the elastomeric matrix of the packer body.

The overall packer body is made unitary such as by vulcanization under the appropriate pressure and temperature to effect a flowing of the rubber layers into a compact unitary mass with the reinforcement layers embedded therein.

Figure 4:
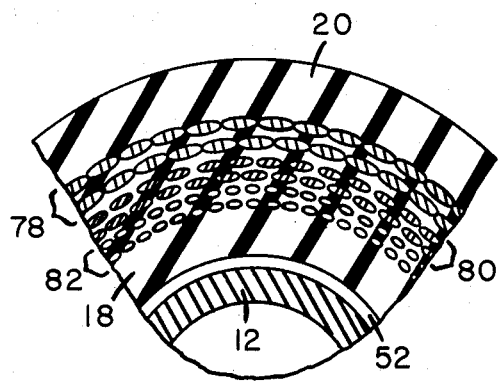
FIG. 4 is a broken, transverse sectional view of an alternative embodiment of the packer element assembly of the invention.

Referring now to FIG. 4, an alternative embodiment is shown in which three different reinforcement zones 78, 80, 82 are employed. Layer 78 is formed of two alternately spiralled layers of high modulus strain-resisting elements similar to that shown in FIG. 3, to form the strength zone. A first transitional zone 80 is composed of alternately spiralled strain-resisting elements of lesser gauge (and modulus) in comparison with the strain-resisting elements in zone 78. Similarly, second transitional zone 82 is employed radially inwardly of the first transitional zone which has, in comparison thereto, strain-resisting helical elments of lesser modulus than in zone 80 to provide an overall progressive gradation of reinforcement characteristic radially in respect to the body of the packer element.

In accordance with the other major aspect of the invention, the reinforcement sheath is securely anchored by attachment to the sleeves 28, 30 at each end of the packer by embedding at least the strain-resisting elements of the strength zone in an annular anchoring matrix 32 positioned along the inside surface of the respective sleeves 28, 30. As shown in FIG. 3, sleeve 28 has an inner bore having a nonuniform bore dimension which progresses generally from a minimum dimension at the packer end 28' to an enlarged, preferably maximum bore dimension 28" near the end of the packer body. In the preferred embodiment shown, the inner bore of the sleeve tapers gradually toward the end of the sleeve in substantially frusto-conical fashion. Alternatively, the inner bore may be stair-stepped, for instance, with the same overall progression of increase in diameter toward the sleeve end of the packer element. As shown, the inner bore of the sleeve may also be provided with indentations or grooves 78 e.g., annular or spiral, serving further to hold the matrix 32 in position when the packer element is subjected to extreme pressures tending to pull the packer body out of engagement with the end sleeves.

It has been found that the sleeve ends of the packer and the reinforcing sheath can be connected securely by spreading the individual strain-resisting elements 25 apart in the area of the inner bore of the sleeve and by embedding such spread apart elements in the annular embedding matrix 32 of epoxy or other rigid material of high compressive strength. At least a portion of the high modulus strain-resisting elements of the strength zone are embedded in the anchoring matrix, although a portion or all of the transition zone lower modulus elements may also be so anchored. A similar anchoring construction has been used for hose couplings (see, for instance U.S. Pat. No. 4,143,892 to Murphy et al., commonly assigned). However, to Applicant's knowledge, this anchoring technique for hose (where the reinforcement helix is at or near the locking angle) has never been applied to connect an inflatable packer body to its end sleeves.

The packer element of the invention may be constructed using the following process. The uncured inner core material 18 is first plied up on a building pole or mandrel in one or more plies (or applied as an extrusion) with reduced thickness under the sleeves, and then the first ply 27d of low modulus strain-resisting elements of the transition zone is laid onto the core at the desired lead angle. In practice the low modulus strain-resisting elements are generally spaced slightly apart from one another, as is characteristic of tire cord. A friction layer 76 of uncured rubber is then applied, followed by the next layer of elements 27c disposed helically in the opposite lay sense in respect to elements 27d. In like manner, friction layer 74, elements 27b, friction layer 72 and elements 27a are plied up in superimposed fashion. Alternatively the tire cord can be pre-frictioned and applied as a calendered fabric or layer. After the interposed elastomeric friction layer 70 is then applied over the last layer of the transition reinforcement zone, the first layer of wire cable or other high modulus strain-resisting elements 25b are applied in a lay opposite in sense to the previous layer of low modulus elements 27a.

The first layer of strength elements 25b of wire cable or the like are then applied with the ends fastened down temporarily, short of the end 28" of the sleeve. After friction layer 68 is applied over the first ply of cables, the second ply of elements 25a are applied in the opposite lay sense and similarly tied down at their ends, short of the sleeve. To give the best spread for anchoring the elements 25 in the epoxy matrix it is preferred to apply the second ply of cables 25a in the right-hand sense, as shown. The second layer of strength cables 25 is also tied down e.g., with wire or clips.

The end sleeve 28 is then slipped over the end of the (uncured) packer element and the end seal 47 of uncured rubber is positioned around the edge of the transition zone reinforcement in contact with the core member 18, as shown. Retention collar 42 is then threaded into place with the aid of tool-receiving detents 49.

At this point the cables of the strength zone are released, e.g., in the manner shown in the aforementioned U.S. Pat. No. 4,143,892. The wires naturally spread apart upon releasing and more or less randomly distribute themselves in a spaced apart manner as shown in FIG. 3. Alternatively, the port 80 for injecting epoxy or other anchoring matrix material may be positioned opposite the clips for access to aid in release of the cables. After release of the cables the epoxy is poured or forced into one or more of the ports 80 until preferably all of the voids around the spread apart cables 25 are substantially filled with the anchoring material.

The cover 20 is then plied up in one or more layers and preferably over the end of the sleeve up to an intermediate point 82, and then a conventional curing tape of nylon or the like is wrapped over the structure and then the entire element is cured, as by vulcanization for a time period at the desired temperature and pressure.

In an actual working example the previous method was generally used to produce an inflatable packer of seven inch outside diameter and 4.44 inch internal diameter, for use as an open hole inflatable packer. Six plies of frictioned polyester tire cord of 1300 denier were used for the transitional reinforcement zone, applied at a 15° lead angle. The strength zone was composed of two layers of spiralled brass finished steel cable, having a mean diameter of 0.138 inches, spiralled at 15° lead angles of opposite hand. The cable was applied in a tight pack, the individual wires substantially touching adjacent cables. The resultant built-up packer was cured in a steam atmosphere for about one hour at 300° F. The finished packer was tested by inserting it in a tubular test fixture, simulating a well bore and then inflating to an internal pressure of 1200 psi. After pressurizing the packer against the inner surface of the test fixture, a differential pressure (i.e., $P_1-P_2$) of 5000 psi was applied without causing the packer to rupture or otherwise fail. After release of the differential pressure, the internal inflation pressure was released and the packer deflated to substantially its original uninflated configuration. This test cycle was repeated 5 times, without failure of the packer.

The inflatable packer described above was also tested in a well penetrating a subterranean formation, under actual environmental conditions and it performed as designed.

While certain representative embodiments and details have been shown for the purpose of illustrating the invention, it will be apparent to those skilled in this art that various changes and modifications may be made therein without departing from the spirit or scope of the invention.

What is claimed is:

1. An inflatable packer comprising:
    an elastomeric tubular core;
    an outer cover;
    an annular reinforcement sheath sandwiched between the core and cover and comprising multiple reinforcement zones, namely:
        a strength zone composed of strain-resisting elements of relatively high modulus, said elements being helically disposed, alternately in opposite lay sense within the sheath annulus at lead angle(s) of less than 40°; and
        a transition zone disposed radially inwardly of the strength zone composed of a plurality of layers of strain-resisting elements of relatively low modulus compared to those of the strength zone, portions of the low modulus elements being helically disposed respectively in opposite lay sense within the sheath annulus at lead angle(s) of less than 40°; and
    sleeve means to which at least a portion of the reinforcement is attached at respective ends of the packer.

2. The inflatable packer of claim 1 wherein the high modulus elements are anchored by embeddment in an annular substantially frustro-conical rigid matrix attached to the sleeve means.

3. The inflatable packer of claim 1 wherein the high modulus elements are present in an even number of layers of spiralled elements.

4. The inflatable packer of claim 1 wherein the high modulus elements are disposed in a braid sheath or sheaths.

5. The inflatable packer of claim 1 wherein at least one of said high modulus elements and low modulus elements are embedded in elastomeric material, and wherein layers of high modulus elements and low modulus elements are separated by elastomeric layers.

6. The inflatable packer of claim 1 wherein the high modulus elements are formed of wire filament or cable, and the low modulus elements are formed of textile cord.

7. The inflatable packer of claim 6 wherein the textile cord is present in the form of tire cord.

8. An inflatable packer for sealing an annular space in a well bore about a supporting element to which the packer is attached, comprising:
    a vulcanized cover formed of elastomeric material;
    an annular reinforcement sheath embedded in vulcanized elastomeric material and sandwiched between the core and cover and integral therewith, the sheath comprising:
        a strength zone composed of a plurality of layers of strain-resisting elements of relatively high modulus, said elements being helically disposed alternately in opposite lay sense within the sheath annulus at lead angle(s) of less than 30°; and
        a transition zone disposed radially inwardly of the strength zone composed of a plurality of layers of strain-resisting elements of relatively low modulus compared to those of the strength zone, portions of the low modulus elements being helically disposed respectively in opposite lay sense within the sheath annulus at lead angle(s) of less than 30°; and sleeve means to which at least a portion of the reinforcement is attached at respective ends of the packer.

9. The inflatable packer of claim 8 wherein the high modulus elements are present in an even number of layers of spiralled elements.

10. The inflatable packer of claim 8 wherein the high modulus elements are formed of wire filament or cable, and the low modulus elements are formed of textile cord.

11. An inflatable packer having an inflatable portion and terminal end portions, comprising:

an elastomeric tubular core;

an outer cover;

an annular reinforcement sheath sandwiched between the core and cover and comprising at least one reinforcement zone composed of strain-resisting elements of relatively high modulus, said elements being helically disposed alternately in opposite lay sense within the sheath annulus at lead angle(s) of less than 40°; and sleeve means having an inner bore of differing dimension changing from a lesser dimension near the inflatable portion of the packer to an enlarged dimension near the terminal end of the packer, at least a portion of the high modulus elements being spread apart and anchored by embedment in an annular rigid anchoring matrix positioned immediately adjacent said inner bore of the sleeve means, and said high modulus elements being free from being mechanically clamped between opposed wedging surfaces.

12. The inflatable packer of claim 11 wherein the anchoring matrix is formed of a material of high compressive strength.

13. The inflatable packer of claim 11 wherein the high modulus elements are substantially tightly packed together in the inflatable portion.

14. The inflatable packer of claim 11 wherein the annular matrix is substantially frusto-conically shaped.

15. An inflatable packer having an inflatable portion and terminal end portions, comprising:

an elastomeric tubular core;

an outer cover;

an annular reinforcement sheath sandwiched between the core and cover and comprising a first reinforcement zone composed of strain-resisting element of relatively high modulus, said elements being helically disposed alternately in opposite lay sense within the sheath annulus at lead angle(s) of less than 40°, and a second reinforcement zone positioned between the core and sheath of high modulus reinforcing elements, formed of a plurality of layers of strain-resisting elements of relatively low modulus compared to those of the first reinforcement zone, portions of the low modulus elements being helically disposed respectively in opposite lay sense within the sheath annulus at lead angle(s) of less than 40°; and sleeve means to which at least a portion of the reinforcement is attached at respective ends of the packer; and said sleeve means having an inner bore of differing dimension progressing from a lesser dimension near the inflatable portion of the packer to an enlarged dimension near the terminal end of the packer, at least a portion of the high modulus elements being anchored by embedment in an annular anchoring matrix positioned immediately adjacent said inner bore of the sleeve means, to provide said attachment to the ends of the packer.

16. The inflatable packer of claim 12 wherein the anchoring matrix is formed of a hardened epoxy resin.

17. The inflatable packer of claim 11 wherein the inner bore of the sleeve means tapers gradually from the lesser dimension near the inflatable portion of the packer to the enlarged dimension near the terminal end of the packer.

18. The inflatable packer of claim 17 wherein the inner bore of the sleeve means is provided with indentations, said anchoring matrix being lodged in said indentations.

19. A unitary composite inflatable packer having an inflatable portion and terminal end portions, comprising:

an elastomeric tubular core;

an outer cover;

an annular reinforcement sheath sandwiched between the core and cover and comprising at least one reinforcement zone composed of strain-resisting elements of relatively high modulus, said elements being helically disposed alternately in opposite lay sense with the sheath annulus at lead angle(s) of less than 40°; and sleeve means having an inner bore of differing dimensions changing from a lesser dimension near the inflatable portion of the packer to an enlarged dimension near the terminal end of the packer, at least a portion of the high modulus elements having uncompressed ends randomly spread apart and anchored by embeddment in an annular rigid anchoring matrix positioned immediately adjacent said inner bore of the sleeve means;

said core, cover and reinforcement integrated into a unitary vulcanized body.

20. The inflatable packer of claim 19 wherein the anchoring matrix is formed of an epoxy material of high compressive strength.

21. The inflatable packer of claim 19 wherein the high modulus elements are substantially tightly packed together and formed of at least one pair of spiral sheaths in the inflatable portion.

22. The inflatable packer of claim 19 wherein the annular matrix is substantially frustro-conically shaped.

23. The inflatable packer of claim 19 including a second reinforcement zone positioned between the core and sheath of high modulus reinforcing elements, formed of a plurality of layers of strain-resisting elements of relatively low modulus compared to those of the said one reinforcement zone, portions of the low modulus elements being helically disposed respectively in opposite lay sense within the sheath annulus at lead angle(s) of less than 40°.

24. The inflatable packer of claim 19 wherein the inner bore dimension of the sleeve tapers progressively from the lesser dimension to the enlarged dimension.

25. The inflatable packer of claim 24 in which the inner bore carries indentations therein serving to further hold the anchoring matrix when the packer is inflated.

26. The inflatable packer of claim 19 wherein the inner bore of the sleeve is stair-stepped, to provide said differing dimensions.

27. The inflatable packer of claim 19 wherein said lead angle(s) is less than 30°.

28. The inflatable packer of claim 19 wherein the elastomeric tubular core serves as the radial innermost portion of the packer at the terminal end portion, and the tubular core extends opposite substantially the full longitudinal extent of said anchoring matrix.

29. The inflatable packer of claim 19 wherein said high modulus elements are free from being mechanically clamped between opposed wedging surfaces.

30. The inflatable packer of claim 19 wherein the annular dimension of said annular rigid anchoring matrix measured radially is greater than the cross dimension of a single high modulus element.

31. An inflatable packer element, comprising:
an inflatable elastomeric body including an annular reinforcement sheath comprising relatively high modulus reinforcing elements;
an end shoe adjacent an annular sleeve means, said sleeve means including an inner surface outwardly disposed about end portions of said reinforcing elements and including a longitudinally outward portion and a longitudinally inward portion extending radially inwardly from the outward portion; and
a hardened ring formed from a liquid adhesive, said ring having end portions of said reinforcing elements spaced apart and embedded therein, and said reinforcing elements being free from being mechanically clamped between opposed wedging surfaces, said ring having a radially outer surface conforming to and bonded to said inner surface of said sleeve means, and said ring having a longitudinally inner portion engaging said longitudinally inward portion of said inner surface of said sleeve means, so that when a tension load is placed on said reinforcing elements a portion of said load is transferred by said ring in compressing against said sleeve means.

32. The inflatable packer element of claim 31 wherein the relatively high modulus reinforcing elements are helically disposed alternately in opposite lay sense within the reinforcement sheath annulus at lead angle(s) of less than 40°.

33. An inflation packer, comprising:
a packer mandrel;
an upper body attached to an upper end of said packer mandrel;
a valve assembly attached to a lower part of said packer mandrel; and
an inflatable packer element disposed about said packer mandrel, said packer element including: an inflatable elastomeric body including a reinforcing element embedded therein, said reinforcing element including first and second layers including a plurality of helically disposed parallel cables, the cables of said first layer being angularly biased in a first angular direction of less than 40° relative to a longitudinal centerline of said reinforcement element, and the cables of said second layer being angularly biased in a second angular direction of less than 40° opposite said first angular direction;
a sliding end shoe slidably engaging said upper body and including an upper annular sleeve means, said sleeve means including an inner surface outwardly disposed about an upper end portion of said reinforcing element;
an upper hardened ring formed from a liquid adhesive, said upper hardened ring having said upper end portion of said reinforcing element embedded therein, and said reinforcing elements being free from being mechanically clamped between opposed wedging surfaces, and said upper hardened ring having a radially outer surface conforming to said inner surface of said sleeve means of said sliding end shoe;
a fixed end shoe attached to said valve assembly and including a lower annular sleeve means, said lower sleeve means including an inner surface outwardly disposed about a lower end portion of said reinforcing element; and
a lower hardened ring formed from said liquid adhesive, said lower hardened ring having said lower end portion of said reinforcing element embedded therein, and said reinforcing elements being free from being mechanically clamped between opposed wedging surfaces, and said lower hardened ring having a radially outer surface conforming to said inner surface of said lower sleeve means.

34. The packer of claim 33 wherein:
said upper sleeve means includes an upper radially inward extending portion located adjacent and engaging a lower portion of said upper hardened ring, and said lower sleeve means includes a lower radially inward extending portion located adjacent and engaging an upper portion of said lower hardened ring, said upper and lower sleeve means and hardened rings being so arranged and constructed that when a tension load is placed on said reinforcing element a portion of said load is transferred by said hardened rings in compression against said radially inward extending portion of said sleeve means.

35. An inflatable packer having an inflatable portion and terminal end portions, comprising:
an elastomeric tubular core;
an outer cover;
an annular reinforcement sheath sandwiched between the core and cover and comprising at least one reinforcement zone composed of strain-resisting elements of relatively high modulus, said elements being helically disposed alternately in opposite lay sense within the sheath annulus at lead angle(s) of less than 40°;
sleeve means having an inner bore of differing dimension changing from a lesser dimension near the inflatable portion of the packer to an enlarged dimension near the terminal end of the packer, at least a portion of the high modulus elements being spread apart and anchored by embeddment in an annular rigid anchoring matrix positioned immediately adjacent said inner bore of the sleeve means; and
said elastomeric tubular core serving as the radial innermost portion of the packer at the terminal end portion, and the tubular core extending opposite substantially the full longitudinal extent of said anchoring matrix.

* * * * *